United States Patent
Lepke et al.

(10) Patent No.: US 8,885,986 B2
(45) Date of Patent: Nov. 11, 2014

(54) SMALL DIAMETER RADIATION SENSOR CABLE

(75) Inventors: Steven Lepke, Wakefield, MA (US); Eric Hyman, Arlington, MA (US); John Isham, Houston, TX (US); Randy Dahl, Tempe, AZ (US)

(73) Assignee: RadiaDyne LLC, Houston, TX (US)

( * ) Notice: Subject to any disclaimer, the term of this patent is extended or adjusted under 35 U.S.C. 154(b) by 280 days.

(21) Appl. No.: 13/444,584

(22) Filed: Apr. 11, 2012

(65) Prior Publication Data
US 2012/0281945 A1 Nov. 8, 2012

Related U.S. Application Data

(60) Provisional application No. 61/481,503, filed on May 2, 2011.

(51) Int. Cl.
| G02B 6/00 | (2006.01) |
| G01T 3/06 | (2006.01) |
| G01T 1/20 | (2006.01) |

(52) U.S. Cl.
CPC ...................... *G01T 1/201* (2013.01)
USPC ........ 385/12; 606/16; 250/390.11; 250/484.5

(58) Field of Classification Search
CPC ..................................... G01T 1/201
USPC ............. 385/12, 139; 606/15, 16; 250/361 R, 250/368, 369, 390.11, 483.1, 484.5
See application file for complete search history.

(56) References Cited

U.S. PATENT DOCUMENTS

| 5,006,714 | A | * | 4/1991 | Attix ............................ 250/368 |
| 5,811,814 | A | * | 9/1998 | Leone et al. ................. 250/368 |
| 5,905,262 | A | * | 5/1999 | Spanswick .................... 250/368 |
| 6,551,231 | B1 | * | 4/2003 | Bliss et al. ........................ 600/1 |
| 6,920,202 | B1 | * | 7/2005 | Dinsmore .................... 378/119 |
| 7,662,083 | B2 | | 2/2010 | Gueye et al. |
| 7,663,123 | B2 | * | 2/2010 | Fleming et al. ............ 250/484.5 |
| 8,183,534 | B2 | | 5/2012 | Archambault |
| 8,735,828 | B2 | * | 5/2014 | Beddar et al. ................. 250/362 |
| 2004/0147811 | A1 | | 7/2004 | Diederich et al. |
| 2007/0005041 | A1 | | 1/2007 | Frassica et al. |

FOREIGN PATENT DOCUMENTS

| WO | 2004080522 | 9/2004 |
| WO | 2007085060 | 8/2007 |
| WO | 2010080905 | 7/2010 |

OTHER PUBLICATIONS

David M. Klien, Ramesh C. Tailor, Louis Archambault, Lilie Wang, Francois Therriault-Proulx, A. Sam Beddar, "Measuring output factors of small fields formed by collimator jaws and multileaf collimator using plastic scintillation detectors" Med Phys., 2010, 37(10): 5541-5549.

(Continued)

*Primary Examiner* — Daniel Petkovsek
(74) *Attorney, Agent, or Firm* — Boulware & Valoir

(57) ABSTRACT

A duplex plastic optical fiber may be used to create a dual detector system, which allows for the detection of two distinct areas of radiation in a single sensor cable device. A fiber cap holds a scintillating fiber and slides over an exposed portion of an optical fiber adjacent to an end of the optical fiber to create a concentric connection for a radiation sensor cable used in medical radiation therapy.

4 Claims, 5 Drawing Sheets

(56) References Cited

OTHER PUBLICATIONS

Beddar A.-S.; Kinsella, K.J.; Ikhlef, A.; Sibata, C.H., "A miniature "scintillator-fiberoptic-PMT" detector system for the dosimetry of small fields in stereotactic radiosurgery," Nuclear Science, 2001, vol. 48, No. 3, pp. 924,928.

Klein D, Briere TM, Kudchadker R, Archambault L, Beaulieu L, Lee A, Beddar S., "In-phantom dose verification of prostate IMRT and VMAT deliveries using plastic scintillation detectors", Radiat Meas., 2012, 47(10):921-929.

A S Beddar et al, "Water-equivalent plastic scintillation detectors for high-energy beam dosimetry: I. Physical characteristics and theoretical considerations", Phys. Med. Biol., 1992, 37: 1883-1900.

Fluhs D., et al., "Direct reading measurement of absorbed dose with plastic scintillators—the general concept and applications to ophthalmic plaque dosimetry", Med Phys. 23(3):427-304, Mar. 1996.

Beddar A.S., et al., "Plastic scintillation dosimetry: optimization of light collection efficiency", Phys Med Biol. 48 (9):1141-52, 2003.

Alcon E.P., "EPR study of radiation stability of organic plastic scintillator for cardiovascular brachytherapy Sr90-Y90 beta dosimetry", Appl Radiat Isot. 62(2):301-6, 2005.

\* cited by examiner

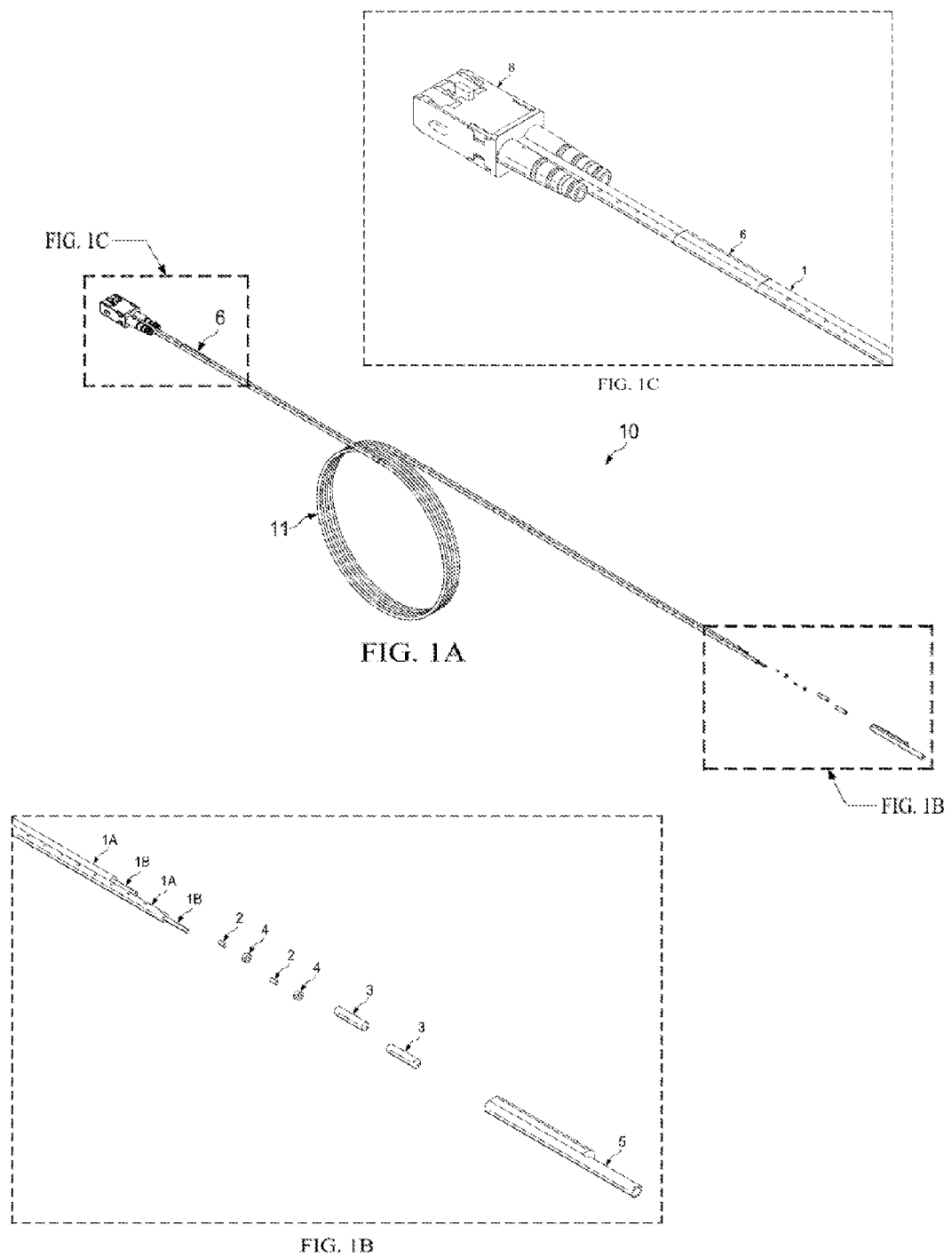

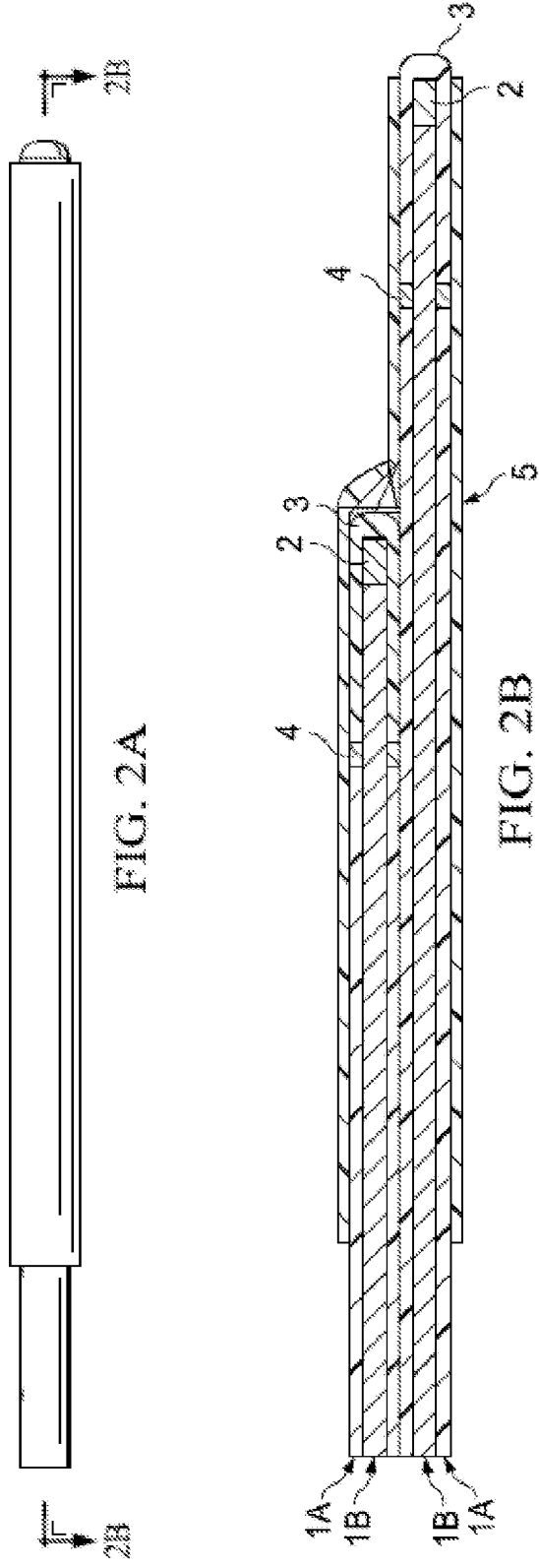

SMALL DIAMETER RADIATION SENSOR CABLE

CROSS-REFERENCE TO RELATED APPLICATIONS

This application claims priority to 61/481,503, filed May 2, 2011, and incorporated by reference in its entirety.

STATEMENT REGARDING FEDERALLY SPONSORED RESEARCH OR DEVELOPMENT

N/A

NAMES OF PARTIES TO A JOINT RESEARCH AGREEMENT

N/A

REFERENCE TO AN APPENDIX SUBMITTED ON COMPACT DISC

N/A

FIELD OF THE INVENTION

This invention relates to radiation sensor cables of very small diameter, such that they are suitable for use in medical applications.

BACKGROUND OF THE INVENTION

A scintillator is a special material that exhibits scintillation—the property of luminescence when excited by ionizing radiation. Luminescent materials, when struck by an incoming particle, absorb its energy and scintillate, in other words they reemit the absorbed energy in the form of light.

A scintillation detector or scintillation counter is obtained when a scintillator is coupled to a light sensor such as a photomultiplier tube (PMT), photodiode, PIN diode or CCD-based photodetector. The light sensor will absorb the light emitted by the scintillator and reemit it in the form of electrons via the photoelectric effect. The subsequent multiplication of those electrons (sometimes called photo-electrons) results in an electrical pulse that can be analyzed and provides meaningful information about the particle that originally struck the scintillator. In this way, the original amount of absorbed energy can be detected or counted.

The term "plastic scintillator" typically refers to a scintillating material where the primary fluorescent emitter, called a fluor, is suspended in a solid polymer matrix. While this combination is typically accomplished through the dissolution of the fluor prior to bulk polymerization, the fluor is sometimes associated with the polymer directly, either covalently or through coordination, as is the case with many $Li_6$ plastic scintillators. Polyethylene naphthalate has been found to scintillate without any additives and is expected to replace existing plastic scintillators due to its higher performance and lower price.

The advantages of plastic scintillators include fairly high light output and a relatively quick signal, with a decay time between 2-4 nanoseconds. The biggest advantage of plastic scintillators, though, is their ability to be shaped, through the use of molds or other means, into almost any desired form with a high degree of durability.

In the field of medical radiation therapy, plastic scintillation detectors are used to convert radiation energy into light energy, and the light photons are counted to accurately determine the radiation dose. The scintillating plastic must transfer its photons to a device that can read them, which is commonly done by coupling one or more scintillating fibers to one or more plastic optical fibers (POF). The POF is then connected to a device that can read and analyze the optical output.

Manufacturing a high volume of such sensor cables is difficult because an accurate and repeatable connection of the plastic scintillator fiber to the plastic optical fiber is required. The problem arises from working with small diameter optical fibers that must be constructed accurately, yet at a low cost.

The current process used to create a sensor cable with a plastic scintillation detector relies on many precise, time-consuming steps. First, both ends of the scintillating fiber must be cut and polished. These cuts and polishes are difficult to do because the diameter (1 mm) and length (2 mm) of the scintillation fiber are very small. Next, the optical fiber must be cut, stripped and polished. Then the scintillating fiber is attached to the optical fiber with optical adhesive. A small piece of the optical fiber's jacket can be used to hold the two fibers in place when adhering. This step is challenging due to the small size of the fibers and the need to perfectly align their cores. A black paint or coating is then applied to the distal end of the fiber in order to keep the assembly light tight. The finished assembly is vulnerable to breakage because reliance is placed on the strength of the epoxy bond to hold the assembly together, and on a soft jacket material (PE or PVC) to hold the assembly in alignment. Due to the labor intensive process and time consuming steps, it is very expensive to produce a detector in this fashion, and the process also introduces variability from detector to detector. The current process also uses twist on (FC) or screw on (SMA) metal-bodied fiber connectors at the other end of the sensor cable. Applying these connectors adds more time to the process, and the FC and SMA connectors are expensive.

Therefore, a need exists for a novel manufacturing process and system for a radiation sensor cable to solve these problems.

BRIEF SUMMARY OF THE INVENTION

Generally speaking, the invention relates to tiny plastic scintillator detector cables, suitable for medical uses, methods of fabricating same and various applications therefor. The tiny and inexpensive scintillator detectors are used to assess radiation dosage in real time, and provide a tremendous advance in the field, which heretofore has lacked such tiny, inexpensive detectors for use inside a body cavity at the actual location of the radiation therapy. Applications include stereotactic radiosurgery/stereotactic radiotherapy (SRS/SRT), intensity modulated radiation therapy (IMRT), dynamical arc therapy, tomotherapy treatments, and any similar application where radiation sensing in a small area is needed, including non-medical applications.

In one embodiment, the plastic scintillator detector cable consists of a single, short length of scintillator fiber operably coupled to a suitable length of optic fiber, which has a standard data coupler or connector at the end of the cable opposite the scintillator fiber. The scintillator detector is thus at the distal end of the cable and a suitable data coupler is at the proximal end, and the entirety of the cable is enclosed in a flexible, opaque covering.

In another embodiment, the cable is hardwired directly to a photodetector, thus avoiding connector use. However, the use of the connector may be preferred as it allows for quick and easy replacement of damaged cables.

In another embodiment, the cable has at least two separate, but closely juxtaposed, plastic scintillator detectors. The two detectors are parallel, but offset from one another in the longitudinal axis, so that radiation can be simultaneous assessed at two ends of a target, such as on either end of the prostrate or both ends of an irradiated throat area, and the like.

In another embodiment, an additional fiber optic cable without plastic scintillator detector can be added thereto, and can serve the function of allowing the subtraction of any background signal, which can arise from the inherent dark current of the PMT or mostly Cerenkov light generated in the fibers. However, these effects are negligible for photon beams, and thus this extra cable is not needed.

Additional plastic scintillation detectors can be added if desired to assess radiation in three or more places along a longitudinal radiation axis. However, single scintillation detectors can also be used where sufficient for the application in question, e.g., where the area to be irradiated is quite small.

Where it is desired to assess radiation levels over more than one axis, e.g., with a larger radiation zone, a second plastic scintillator detector cable can be added, somewhat offset from the first cable (offset in the axis perpendicular to the cable), although this will obviously increase the overall size and cost of the device accordingly.

The scintillator detector can be combined with any medical device suitable for insertion into a body cavity, such as a prostate balloon, vaginal balloon, catheter, needle, brachytherapy-applicator, surgical implements, and the like.

For balloon usage, a small strip of balloon material can be welded to the outer surface thereof, and the scintillator cable threaded therethrough, thus reliably positioning the detector on the outer surface of the balloon. Alternatively, the cable can be placed inside the balloon and held with one or more spot welds and/or small strips of balloon material or other attachment means.

For solid medical devices, such as brachytherapy applicators, a small tube can be affixed thereto, and the tiny cable threaded inside the small tube, or the cable can be affixed directly to the applicator. Alternatively, a removable balloon can be provided for the applicator, such as is already described. The cable can also be threaded inside a catheter or needle, and other device used to access a body cavity.

The scintillator detector cable has any suitable data connector or adaptor at the proximal end thereof, and is plugged into any existing or dedicated signal detection and computer system for collecting, analyzing and outputting the data collected by the scintillator detector.

Suitable connectors include FDDI, ESCON, SMI, SCRJ, and the like, and will of course vary according to the system that is intended to be used with the scintillator detector cable. The data connectors can be single connectors, even for a dual or triple detector embodiment, but preferably a dual connector is used for the dual detector embodiment, etc., which keeps the cables neat and can prevent plugging sensors into the wrong channels if the connector has asymmetry.

Because the scintillator detector is quite small, novel fabrication methods were developed to allow cost effective, reliable manufacture and assembly therefore. A special cap was therefore designed to allow the scintillator fiber to be reliably connected to the fiber optic cable. This cap is essentially tube shaped with a blind end, such that the scintillator fiber fits entirely into the blind end, and the fiber optic cable fits behind it. Thus, the hollow interior closely holds the ends of the two fibers in close juxtaposition (direct contact or "abutting") without the need for any adhesive on the ends of the two fibers, which greatly improves both sensitivity and reliability. The hollow interior is thus shaped to closely fit the naked fibers, and in many instances will have a circularly cross-section, although this can of course vary if the fiber cross section is varied.

The tube could also have two open ends, but one closed end is preferred as better protecting the fragile fiber, and avoiding a closure step. However, a dual opening cap may be preferred for longer fibers since the dual opening variant can be loaded from either end. The cap can also comprise two components fitted together, e.g., by threadable or snap fits ends, but the unitary construction is the simplest to make and use. Where the tube has an open end, it can be covered with heat shrinkable tubing, a jacket, opaque coating, snap fit lid, or any other means of making it light tight, and preferably water tight. A snap fitting lid can easily be attached to the tube with a small hinge, thus providing a unitary construction that can be made by injection molding, and still allowing tube loading from both ends.

The cap can also be designed with a small extra space left inside for placement of a fiducial marker. In this way, an imaging device, such as a tungsten, gold, barium, carbon or any other radiopaque or reflective pellet can be placed in the tip of the cable and assist in its placement inside the body. Alternatively, the pellet can be placed outside the cap, e.g., on the outer surface or tip thereof. In fact, the cap can be injection-molded with a small snap fit recess into which an imaging pellet can be snap fit.

The blind cap can be affixed to the optical fiber using an optional bead of adhesive at the open end, which will thus only touch the side of the naked optical fiber, or an external clamp can be used, or the blind cap itself can be made of heat shrinkable material for a tight fit. However, we have found that a harder plastic functions best to keep the two cables aligned, and prefer a high impact polystyrene or similar resin for this purpose. Preferable resins have a hardness of 45 or below, and preferably has 30-40 Shore D.

Alternatively or in addition thereto, an exterior coating of heat shrinkable material can be added thereto for good strength and fit. The shrink tubing covers at least the detector end of the device and protects the detector, while keeping the components together in a tight bundle that remains flexible and can move in all directions. Where the cap is opaque, part of the cap can protrude from the heat shrinkable tubing. The shrink tubing can also cover most or all of the cable, but this will generally not be needed since plastic optical fibers are usually already jacketed, although the heat shrinkable tubing will also function to keep the fibers tightly bundled and thus may be of benefit.

Suitable plastics for the blind cap include high impact polystyrene, polybutadiene, acrylonitrile butadiene styrene, polyvinyl chloride, polycarbonate, polyacrylate, polyethylene terephthalate glycol, high density polyethylene, polypropylene, high impact rigid polyvinyl chloride, and polytetrafluoroethylene, and blends and copolymers thereof. Preferred materials are opaque in color to keep the assembly light tight. Alternatively, the cap can be covered in an opaque material and thus plastics with high clarity can be used, such as polycarbonate and polyacrylate.

Also preferred, the blind cap is constructed from a water equivalent plastic so as to not perturb the radiation dosage, and it is known in the art how to assess water equivalence at different energy ranges. Where the plastic is not quite water equivalent, it is known how to apply a scaling factor. See D. Mihailescu and C. Borcia, Water Equivalency Of Some Plastic Materials Used In Electron Dosimetry: A Monte Carlo Investigation, Romanian Reports in Physics, Vol. 58, No. 4, P. 415-425, 2006 (incorporated by reference herein).

A hot knife blade is preferably used for cutting each fiber, thereby eliminating the need for polishing. A soldering iron set to 700° F. may be used with a fine point carbon steel blade having a thickness of 0.0235 inches (0.06 cm). Other hot knifes, temperatures, and blade thicknesses are also contemplated, and it is known how to vary the temperature with the material being used. Many industrial hot-knives are available for use, and cutting blocks that function to ensure a 90° cut are also commercially available. Although a hot knife may be preferred, other cutting methods can be used, including laser, water jet, diamond saw, and the like.

Many suitable jacket plastics are known, and preferably are opaque plastics of low antigenicity or medical grade, although any plastic can be used and combined with an appropriate biocompatible coating. Such materials include low smoke zero halogen (LSFH), polyvinyl chloride (PVC), polyethylene (PE), polyurethane (PUR), polybutylene terephthalate (PBT), polyamide (PA), and the like.

Particularly preferred jacket materials are medical grade polyurethanes due to their lack of plasticizers and which are available in a variety of hardness, ranging from 60 Shore D to 90 Shore A. Particularly preferred are softer plastics of 70-80 Shore A and which give the cable considerably flexibility combined with sufficient strength. However, the polyurethane may need to overlay an opaque plastic, such as black PVC, unless opaque pigments are added thereto or an opaque paint is applied thereto.

Also preferred are cable materials that withstand sterilization procedures, such as autoclaving, gamma irradiation or chemical treatments, although sterilization may be optional if combined with a separately sterilizable balloon that can completely contain the sensor, or if a non-sterile device is needed, e.g., for rectal applications.

The use of the word "a" or "an" when used in conjunction with the term "comprising" in the claims or the specification means one or more than one, unless the context dictates otherwise.

The term "about" means the stated value plus or minus the usual margin of error of measurement, or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," and "include" (and their variants) are open-ended linking verbs and allow the addition of other elements when used in a claim.

The phrase "consisting of" is a closed linking verb and does not allow the addition of any other elements.

The phrase "consisting essentially of" occupies a middle ground, allowing the addition of non-material elements such as labels, instructions for use, and the like.

BRIEF DESCRIPTION OF THE DRAWINGS

A better understanding of the invention can be obtained with the following detailed descriptions of the various disclosed embodiments in the drawings, which are given by way of illustration only, and thus are not limiting the invention, and wherein:

FIG. 1A is a perspective view of a partially coiled duplex scintillator cable, with adaptor at the proximal end and exploded scintillator detectors at the distal end.

FIG. 1B is a detail exploded view in area B of FIG. 1A of two exposed duplex optical fibers, two scintillating fibers, two rings of adhesive, two fiber caps, and a heat shrink tubing.

FIG. 1C is a detail view in area C of FIG. 1A showing the adaptor.

FIG. 2A is a plan view of the distal end of the duplex plastic optical fiber of FIG. 1.

FIG. 2B is a cross section of the view in FIG. 2A through lines 2B-2B.

DETAILED DESCRIPTION OF THE INVENTION

Figure 3C:
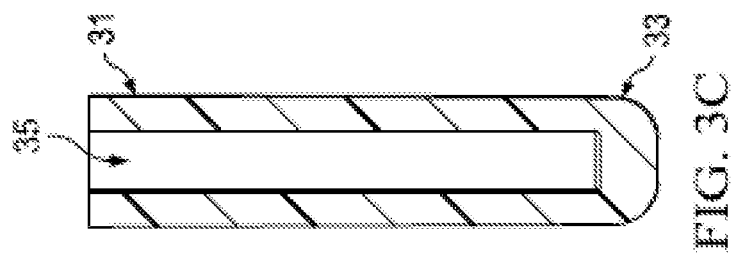
FIG. 3C is a cross-sectional view along line 3C-3C of FIG. 3B.

The parts of FIG. 1A-C are listed herein and preferred materials provided:

| Part No. | Description | Preferred materials |
|---|---|---|
| 1 | Optical fiber | MITSUBISHI SUPER ESKA 1 MM DUPLEX PLASTIC OPTICAL FIBER SH4002 |
| 2 | Scintillating fiber | BCF-60 SAINT GOBAIN SCINTILLATING FIBER PEAK EMMISSION 530 NM |
| 3 | fiber cap | HIGH IMPACT POLYSTYRENE |
| 4 | Adhesive | EPOXY TECHNOLOGIES EPO-TEK 301 |
| 5 | Heat shrinkable tubing | RAYCHEM THERMOFIT CGPE-105 HEAT-SHRINKABLE TUBING |
| 6 | Lot Code Label | NA |
| 8 | Adaptor | SCRJ CONNECTOR |
| 11 | Coiled section of cable. Protruding ends allows for calibration of each cable and is a preferred packaging method. | NA |

Turning to FIG. 1, the duplex scintillation detector cable 10 has a first and second optical fibers 1. The jacket or covering 1A has been stripped or removed from the portion of the first optical fiber 1 adjacent to the distal ends of each fiber (see also FIG. 2B), leaving a portion of each optical fiber 1B exposed. First and second scintillating fibers 2 are shown, along with drop of adhesive 4 and fiber cap 3. The length of scintillating fibers 2 can be varied, according to needed sensitivity and size of area to be assessed, but typically 1-10 mm of length will suffice. We have used 2-3 mm lengths in prototypes.

The scintillating fibers 2 fit into the fiber caps 3, followed by the naked optic fibers 1B, and a drop of epoxy 4. Heat shrink tubing 5 covers the components, which are shown assembled in FIGS. 2A and 2B. At the far end, an adaptor 8 is found, in this case a dual jack adaptor. Label 6 is also shown, but may be placed anywhere on the cable or even on packaging and is not considered material. There is no adhesive 4 on the abutted ends or faces of the respective scintillating fibers 2 and optical fibers 1B, thus signal is optimized.

The duplex optical fiber 1 may be a Super Eska 1 mm duplex plastic optical fiber SH4002 available from Mitsubishi Rayon Co., Ltd. of Tokyo, Japan, although other duplex optical fibers are also contemplated. Although duplex optical fibers 1 are shown, it is also contemplated that a single optical fiber may be used or additional fibers can be added.

The scintillating fibers 2 may be a BCF-60 scintillating fiber peak emission 530 NM available from SAINT-GOBAIN CERAMICS & PLASTICS™, Inc. of Hiram, Ohio, although other scintillating fibers are also contemplated.

FIG. 2A shows a plan view of the detector end of cable and line 2B-2B, through the center of the cable. FIG. 2B is a cross-section at line 2B-2B. Seen here are scintillator fibers 2, inside cap 3, and immediately distal to naked optical fibers 1B. Heat shrink tubing 5 covers the detector/distal end of the cable, thus making a detector assembly. Tubing 5 is shown with a small amount of the distal-most cap protruding, but placement can vary as long as the bundle is tightly held and opaque. Optical fibers past the cap 3 are covered by jacket 1A. A bead of optional adhesive 4 is placed at the end of cap 3 and does not touch the ends of the fibers, but a small amount can travel by capillary action between optical fiber 1B and the inside of cap 3.

Figure 3B:
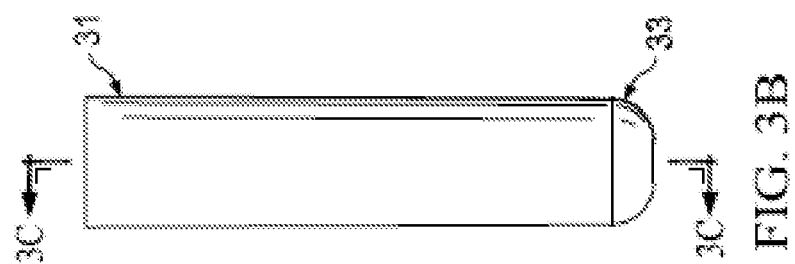
FIG. 3B is a plan view of FIG. 3A.
Figure 3A:
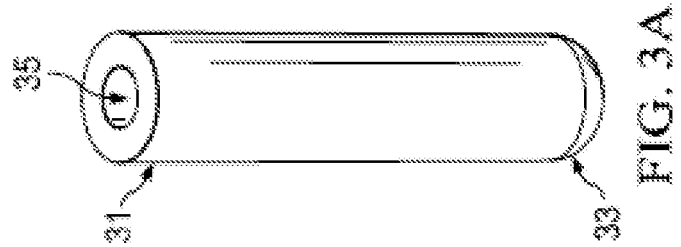
FIG. 3A is an perspective view of the fiber cap of the invention.

The fiber cap 3 is shown in more detail in FIG. 3A-C. Cap 3 has an open end 31, a closed end 33 defining a hollow interior 35 into which fibers 1, 2 tightly fit. The cap 3 is constructed from a water equivalent material, such as polystyrene, and may be opaque in color to keep the assembly light tight. A high impact polystyrene may be used, with a Mold-Tech 11010 texture or smoother, although other materials and textures are also contemplated.

The use of a pair of plastic optical fibers 1 and pair of scintillator fibers 2 allows a dual detector system using two fibers jacketed together to form a single cable. However, the detectors are still independent and give separate measurements of radiation dosage at each location. The duplex scintillator cable 10 combined with the longitudinally offset positioning of two scintillating fiber tips 2 allows for the detection of two distinct areas of radiation in a single sensor cable device. Additional scintillating fibers and optical cables may be added to the cable for additional detection areas.

The small length of shrink tubing 5 covers the detector end of the device and protects the detectors 2 while keeping the assembly together in a tight bundle. The bundle is allowed to flex and move in all directions. If desired, the shrink tubing can cover a longer length of the cable than is shown herein.

The diameter of the cable herein described is very small, and the device is thus tiny enough to be added to existing medical devices for a variety of radiation applications. Preferably, the cable diameter (excluding the proximal adaptor of course) is less than 5 mm, and preferably less than 4, 3, or 2 mm. Yet, in spite of its small size, the device is robust and easily manufactured.

A hot knife may be used to make the process more efficient. By cutting each optical fiber distal end 1 and each scintillating fiber 2 with the hot knife blade, the polishing step of the past may be eliminated. The hot knife cuts a smooth and uniform fiber surface with no scraping or cracking, producing light transmittance results on par with polished fibers.

The optical adhesive used in the past may also be omitted from the method and system. Instead of using adhesive between the exposed optical fiber ends, as is done in the prior art, the optical and scintillating fibers are aligned using the fiber cap 3 and secured by applying optional adhesive 4 only to the open end 31 of the cap 3. The bond is between the cap 3 and the exposed sides of the optical fiber 1 and increases the strength of the assembly and reduces the accuracy needed at the adhesive joint, however the adhesive is optional, as is the shrink tubing.

Figure 4:
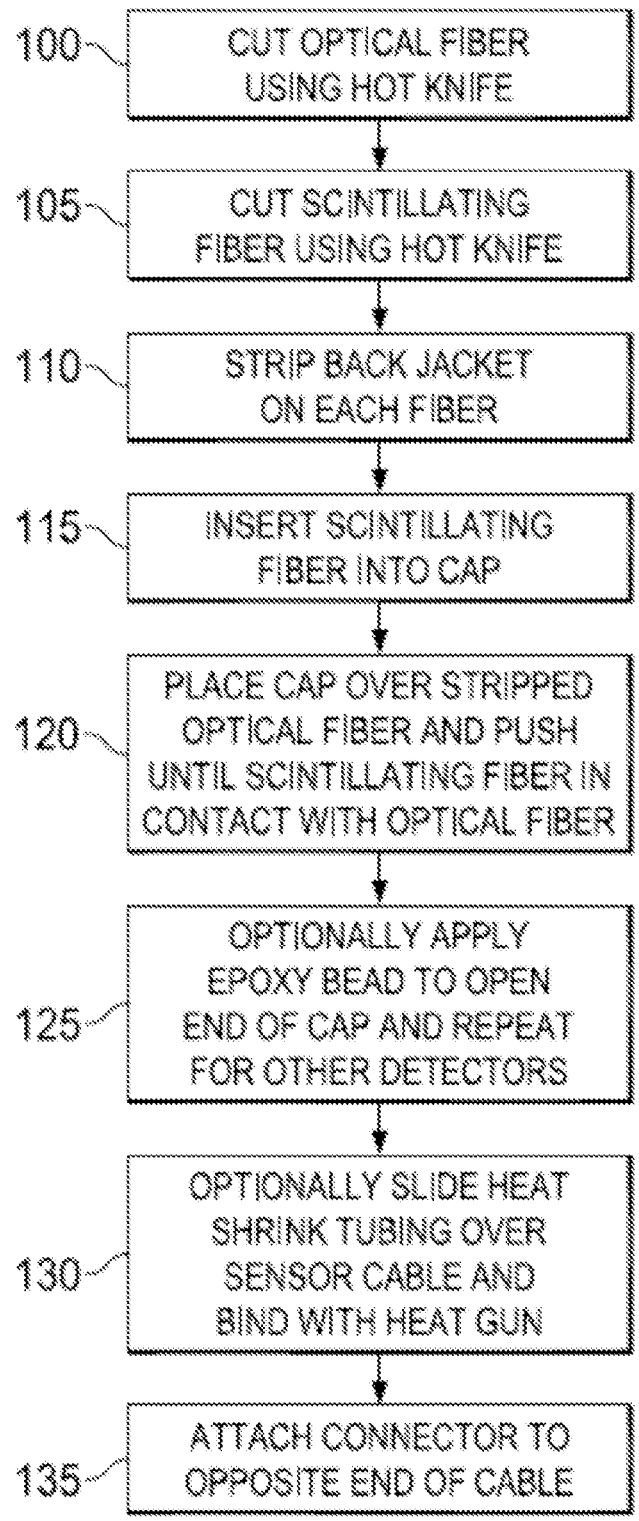
FIG. 4 is a flow diagram of the assembly process.

One embodiment of the assembly process is illustrated in FIG. 4, and is as follows.

Step 1: Cut the plastic optical fiber 1 to length using the hot knife at step 100.

Step 2: Cut the plastic scintillation fiber 2 to length using the hot knife system at step 105.

Step 3: Strip back the jackets (if any) on each fiber 1, 2 to a specified length at step 110.

Step 4: Insert the bare scintillation fiber 2 into the scintillating cap 3 at step 115 and gently push until seated at the blind terminus.

Step 5: Insert bare optic fiber 1 into scintillating cap 3. Gently push until the optical fiber 1 is in good contact with the scintillation fiber 2 at step 120.

Step 6: Apply the optional bead of the UV cure epoxy or other adhesive 4 around the open end 31 of the fiber cap 3 where the optical fiber 1 is exposed. No epoxy 4 contacts the scintillation fiber 2 or the respective abutting ends of the two fibers because only a small amount of adhesive is used.

Step 7: Slide the optional heat shrink tubing 5 over the distal end of the sensor cable 10 so that the edge of the heat shrink 5 is approximately 1 mm away from the distal end of the most distal scintillation cap 3, although it can also completely contain same or more can protrude, as desired. Use a heat gun or oven to shrink down the tubing 5 over the detectors 2 at step 130.

Step 8: Attach an appropriate connector 8 to the proximal end of the cable 10 opposite the detectors 2 at step 135.

The cable is thus fabricated, and can be labeled, packaged and sterilized, as needed.

The process allows for a much quicker and more accurate assembly than in the past. The cable assembly may be produced in high volumes with excellent repeatability. Variations on the methods are contemplated, and fewer steps are also contemplated.

Figure 5:
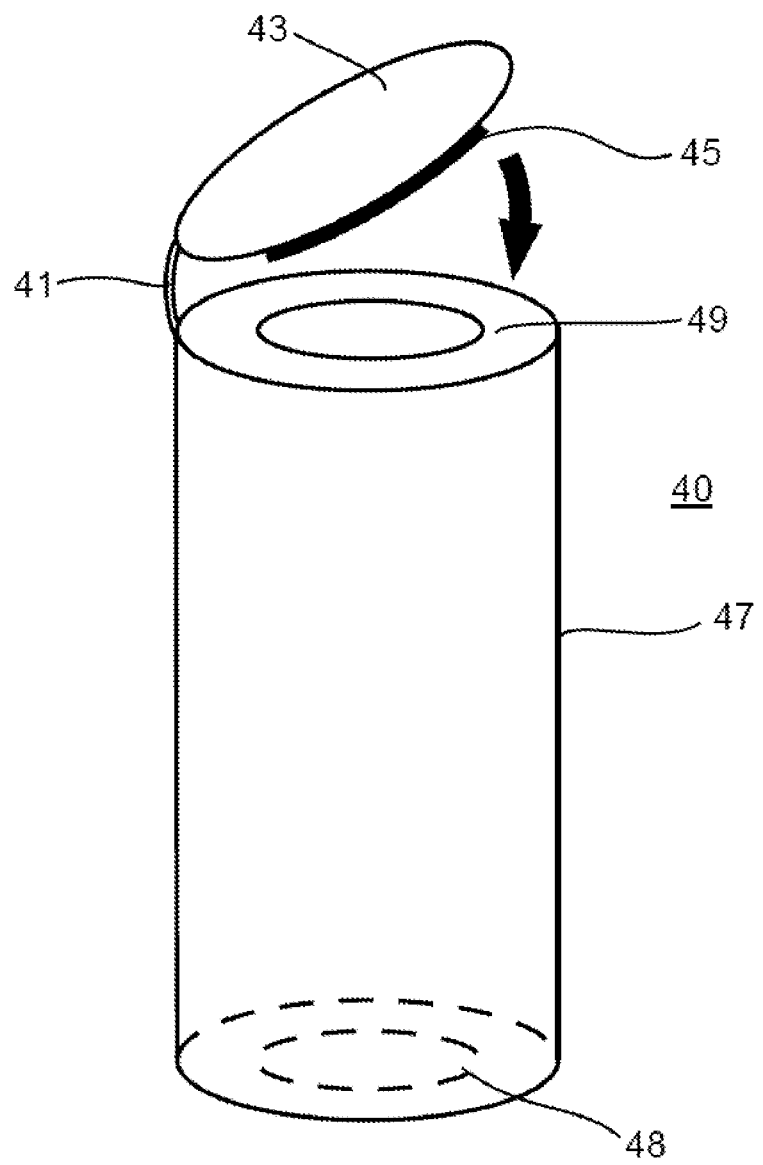
FIG. 5 is a perspective an open cap with hinged snap fitting lid.

FIG. 5 shows an open ended cap 40 that can be of unitary construction made by injection molding. The tube 47 has two open ends 48, 49, each of which can accessed for manufacture of the cable. Once the two fibers are in place, lid 43, held with flexible thin hinge 41, snaps shut, annular edge or lip 45 serving a snap fit function and making the cap light and water tight.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

We claim:

1. A radiation sensor cable, comprising:
   a. first and second distal fiber caps, each having a tubular shape, hollow interior and a closed end and an open end, and being made from a hard polymer of durometer less than 45 Shore D,
   b. first and second plastic optical fibers, each having a distal end and a proximal end;
   c. first and second plastic scintillation fibers;
      wherein said first plastic scintillation fiber fits completely inside said first distal fiber cap at said closed end and is directly abutted to said distal end of said first plastic optical fiber which partially fits inside said first distal fiber cap and partially protrudes therefrom;
      wherein said second plastic scintillation fiber fits completely inside said second distal fiber cap at said closed end and is directly abutted to said distal end of said second plastic optical fiber which partially fits inside said second distal fiber cap and partially protrudes therefrom;
      wherein said first and second distal fiber caps are longitudinally offset from each other,
   d. an opaque jacket enclosing at least a portion of said first and second distal fiber caps and first and second plastic optical fibers; and e. a proximal dual data adaptor operably connected to said proximal ends of said first and second plastic optical fibers;
    wherein the maximum diameter of said radiation sensor cable is less than 2 mm, excluding said proximal dual data adaptor.

2. The radiation sensor cable of claim 1, wherein the proximal dual data adaptor is an SCRJ adaptor.

3. A radiation sensor cable, comprising:
a. first and second distal fiber caps, each having a tubular shape and hollow and being made from a hard polymer of durometer less than 45 Shore D,
b. first and second plastic optical fibers, each having a distal end and a proximal end;
c. first and second plastic scintillation fibers;
    wherein said first plastic scintillation fiber fits completely inside said first distal fiber cap and is directly abutted to said distal end of said first plastic optical fiber which partially fits inside said first distal fiber cap and partially protrudes therefrom;
    wherein said second plastic scintillation fiber fits completely inside said second distal fiber cap and is directly abutted to said distal end of said second plastic optical fiber which partially fits inside said second distal fiber cap and partially protrudes therefrom;
    wherein said first and second distal fiber caps are longitudinally offset from each other, and,
d. an opaque jacket enclosing at least a portion of said first and second distal fiber caps and first and second plastic optical fibers.

4. The radiation sensor cable of claim 3, wherein said opaque jacket encloses said first distal fiber cap.

* * * * *